(12) United States Patent
Tanaka

(10) Patent No.: US 8,077,986 B2
(45) Date of Patent: Dec. 13, 2011

(54) INFORMATION PROCESSING APPARATUS, METHOD OF CONTROLLING SAME AND COMPUTER PROGRAM

(75) Inventor: Tetsuomi Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 960 days.

(21) Appl. No.: 11/757,496

(22) Filed: Jun. 4, 2007

(65) Prior Publication Data

US 2008/0019613 A1 Jan. 24, 2008

(30) Foreign Application Priority Data

Jun. 14, 2006 (JP) .................................. 2006-165360

(51) Int. Cl.
*G06K 9/36* (2006.01)
(52) U.S. Cl. ........ 382/232; 382/166; 382/176; 382/299; 382/300; 358/525; 358/539
(58) Field of Classification Search .................. 382/232, 382/166, 176, 299, 300; 358/525, 539
See application file for complete search history.

(56) References Cited

U.S. PATENT DOCUMENTS

| | | | | |
|---|---|---|---|---|
| 5,568,571 A * | 10/1996 | Willis et al. | ................ | 382/254 |
| 5,638,498 A * | 6/1997 | Tyler et al. | ................ | 358/1.18 |
| 5,767,978 A * | 6/1998 | Revankar et al. | ............. | 358/296 |
| 5,778,092 A * | 7/1998 | MacLeod et al. | ............. | 382/176 |
| 5,832,126 A * | 11/1998 | Tanaka | .......................... | 382/239 |
| 5,949,555 A * | 9/1999 | Sakai et al. | ................... | 358/462 |
| 6,483,609 B1 * | 11/2002 | Ueno et al. | ................... | 358/434 |
| 6,628,833 B1 * | 9/2003 | Horie | ............................. | 382/173 |
| 6,647,125 B2 * | 11/2003 | Matsumoto et al. | ......... | 382/100 |
| 6,731,800 B1 * | 5/2004 | Barthel et al. | ............... | 382/176 |
| 6,778,291 B1 * | 8/2004 | Clouthier | ..................... | 358/1.16 |
| 7,158,669 B2 * | 1/2007 | Tanaka et al. | ................ | 382/166 |
| 7,379,594 B2 * | 5/2008 | Ferman et al. | ............... | 382/176 |
| 7,386,168 B2 * | 6/2008 | Misawa | ........................ | 382/166 |

(Continued)

FOREIGN PATENT DOCUMENTS

JP 08-221512 8/1996

(Continued)

OTHER PUBLICATIONS

Restoring High-resolution Binary images for text enhancement, Hirobumi Nishida, IEEE, 0-7803-9134-9/05, pp. 1-4.*

(Continued)

*Primary Examiner* — Jayesh A Patel
(74) *Attorney, Agent, or Firm* — Cowan, Liebowitz & Latman, P.C.

(57) ABSTRACT

A multivalued original image is converted to a high-resolution image by interpolation processing and the resultant high-resolution image is subjected to binarization processing to obtain a high-resolution binarized image. This is followed by extraction of a plurality of text regions for every text color, as well as position information and text color information of each text region. First compressed data of the text regions is generated by applying compression processing to the high-resolution binarized images at the positions corresponding to the text regions extracted. Second compressed data is generated by filling text regions in the original image with a prescribed pixel value and applying compression processing to the image obtained by such filling. Compressed image data of the original image is then generated, this data including the first compressed data and the second compressed data as well as the position information and color information of each text region.

11 Claims, 14 Drawing Sheets

U.S. PATENT DOCUMENTS

| | | | |
|---|---|---|---|
| 7,639,880 B2 * | 12/2009 | Hasegawa et al. | 382/224 |
| 7,715,640 B2 * | 5/2010 | Ozawa | 382/239 |
| 7,809,199 B2 * | 10/2010 | Aoki et al. | 382/232 |
| 7,876,959 B2 * | 1/2011 | Matsuda et al. | 382/176 |
| 2002/0037100 A1 * | 3/2002 | Toda et al. | 382/166 |
| 2003/0210803 A1 * | 11/2003 | Kaneda et al. | 382/100 |
| 2004/0105129 A1 * | 6/2004 | Kawakami | 358/2.1 |
| 2004/0264793 A1 * | 12/2004 | Okubo | 382/243 |
| 2005/0180645 A1 * | 8/2005 | Hasegawa et al. | 382/239 |

FOREIGN PATENT DOCUMENTS

| | | | |
|---|---|---|---|
| JP | 3106080 | | 9/2000 |
| JP | 2002-077633 | | 3/2002 |
| JP | 2002077633 | * | 3/2002 |
| JP | 2003-018412 A | | 1/2003 |
| JP | 2003-087558 A | | 3/2003 |
| JP | 2004-128880 | | 4/2004 |
| JP | 2004128880 | * | 4/2004 |
| JP | 2004-260327 | | 9/2004 |
| JP | 2004260327 | * | 9/2004 |
| JP | 2005-071088 | | 3/2005 |
| JP | 2005-210543 A | | 8/2005 |
| JP | 2005-275854 A | | 10/2005 |

OTHER PUBLICATIONS

Restoring High-Resolution—Enhancement., Hirobumi Nishida, 0-7803-9134-9, IEEE, 2005, pp. 1-4.*

The above foreign patent documents were cited in a Jan. 24, 2011 Japanese Office Action, which is enclosed without an English Translation, that issued in Japanese Patent Application No. 2006-165360.

* cited by examiner

FIG. 2A
(MULTI-VALUE ORIGINAL IMAGE OF 100dpi)

in print that we would

FIG. 2B
(BINARIZED IMAGE OF 100dpi)

in print that we would

FIG. 2C
(ENLARGE THE BINARIZED IMAGE OF 100dpi)

in print that we would

FIG. 2D
(MULTI-VALUE ORIGINAL IMAGE OF 300dpi)

in print that we would

FIG. 2E
(BINARIZED IMAGE OF 300dpi)

in print that we would

FIG. 2F
(A MULTI-VALUE IMAGE OF 300dpi CONVERTED FROM AN ORIGINAL IMAGE OF 100dpi)

in print that we would

FIG. 2G
(A BINARIZED IMAGE OF 300dpi CONVERTED FROM AN ORIGINAL IMAGE OF 100dpi)

in print that we would

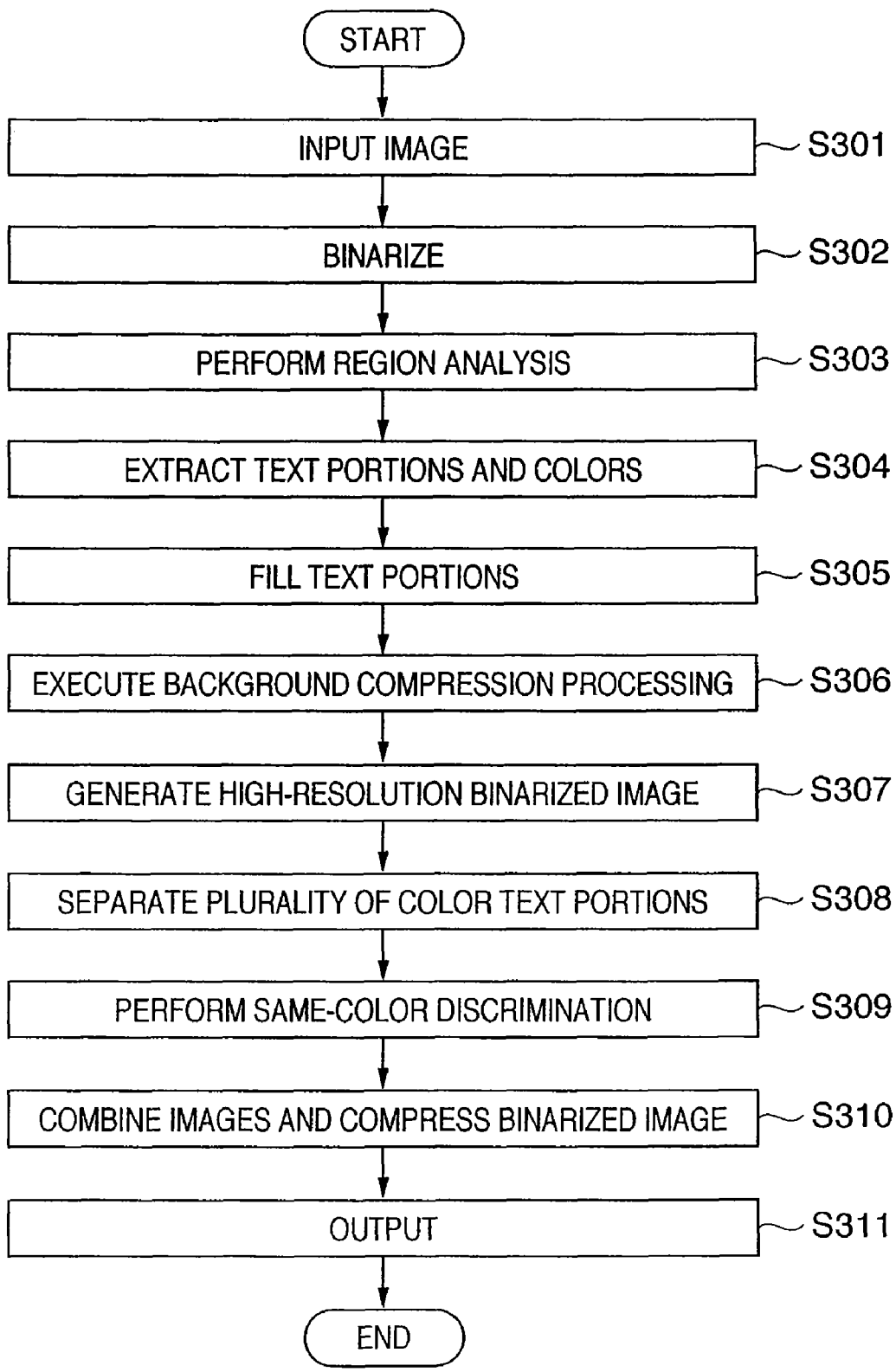

TEXT6

BKBKBKBKBK
BK      BK
BKBKBKBKBK

TEXT7
RED

TEXT8
BU

FIG. 5G

REDRED

BKBKBKBKBK
BKREDBKBU
BKBKBKBKBK

REDREDREDRE
DREDREDREDR

BLACKBLACK
BLACKBLACK

BLUEBL

INFORMATION PROCESSING APPARATUS, METHOD OF CONTROLLING SAME AND COMPUTER PROGRAM

BACKGROUND OF THE INVENTION

1. Field of the Invention

The present invention relates to an image compression technique for applying compression processing to an original image.

2. Description of the Related Art

The digitizing of documents is proceeding owing to the growing popularity of scanners in recent years. When it is attempted to store a digitized document in a full-color bitmap format, a very large amount of memory is required. For example, in the case of size A4, the amount of data is approximately 24 MB at 300 dpi. Such a large amount of data is not a size suitable for transmission by being attached to e-mail or the like. Accordingly, the usual practice is to compress full-color images. JPEG compression is an example of a compression scheme widely used. Further, the specification of Japanese Patent Laid-Open No. 2002-077633 describes an image processing apparatus that employs a compression scheme according to which a text region is extracted from an original image, a text image corresponding to the text region and an image from which the text region is excluded are generated and each of these is subjected to different compression processing.

However, when an attempt is made to raise the compression rate with ordinary JPEG compression, so-called mosquito noise increases in the text portions, which are the important portions of the document, and readability declines as a result. Further, with the method described in Japanese Patent Laid-Open No. 2002-077633, good image quality is not obtained with regard to text portions unless image resolution is greater than a certain value. This will be described further with reference to FIGS. 2A to 2E. FIGS. 2A and 2D illustrate images in a case where images obtained by scanning the same document at 100 dpi and 300 dpi, respectively, are displayed at an equivalent pixel magnification. Images obtained by binarizing these are as shown in FIGS. 2B and 2E, respectively. For the purpose of comparison, FIG. 2C illustrates the result of simply enlarging a 100-dpi binarized image to a size the same as that of a 300-dpi image. It will be appreciated from a comparison of FIGS. 2C and 2E that when a low-resolution image is binarized, text quality declines to an extreme degree. Further, it is very difficult to apply a correction in such a manner that a low-resolution binarized image will come to have improved readability. Accordingly, in case of a low-resolution image, it is difficult to improve text readability with the arrangement described in Japanese Patent Laid-Open No. 2002-077633, which generates a text image using a binarized image obtained by binarizing an original image. In addition, even if an image is a high-resolution image, a similar problem arises with regard to very small characters.

On the other hand, if resolution is raised before an original image is compressed and then this higher-resolution image is compressed as an original image using the method of Japanese Patent Laid-Open No. 2002-077633, the image quality of text portions will be improved. However, since the original image has a high resolution, the compression rate declines (the file size becomes too large). Further, since the number of times image conversion is performed in order to compress the background image portion increases by one, this causes a decline in image quality.

SUMMARY OF THE INVENTION

Accordingly, an object of the present invention is to make possible the compression of an image at a high compression rate while improving the readability of text in document images in which image resolution is low or in which the size of characters is small.

According to one aspect of the present invention, an information processing apparatus for executing compression processing of a multivalued original image comprises a first obtaining unit adapted to increase resolution of the multivalued original image by subjecting the original image to interpolation processing, and apply binarization processing to the image of increased resolution, thereby obtaining a high-resolution binarized image; an extraction unit adapted to extract a text region, per text color, from the original image and extracting position information and text color information of each text region; a first generating unit adapted to extract partial images corresponding to the plurality of text regions extracted from the high-resolution binarized image by the extracting unit, and apply first compression processing to these partial images to thereby generate text-region compressed data corresponding to each text region; a second generating unit adapted to fill a text region of the original image with a predetermined pixel value and apply second compression processing to an image obtained by filling to thereby generate background compressed data; and a third generating unit adapted to generate compressed data of the original image by using the text-region compressed data and the background compressed data as well as the position information and text color information of each text region.

According to another aspect of the present invention, an information processing method of executing compression processing of a multivalued original image comprises a first obtaining step of increasing resolution of the multivalued original image by subjecting the original image to interpolation processing, and applying binarization processing to the image of increased resolution, thereby obtaining a high-resolution binarized image; an extraction step of extracting a text region, per text color, from the original image and extracting position information and text color information of each text region; a first generating step of extracting partial images corresponding to the plurality of text regions extracted from the high-resolution binarized image at the extracting step, and applying first compression processing to these partial images to thereby generate text-region compressed data corresponding to each text region; a second generating step of filling a text region of the original image with a predetermined pixel value and applying second compression processing to an image obtained by filling to thereby generate background compressed data; and a third generating step of generating compressed data of the original image, this data including the text-region compressed data and the background compressed data as well as the position information and color information of each text region.

Further features of the present invention will become apparent from the following description of exemplary embodiments with reference to the attached drawings.

BRIEF DESCRIPTION OF THE DRAWINGS

FIGS. 2A to 2G are diagrams useful in describing a decline in text quality when a low-resolution image is binarized;

FIG. 3 is a flowchart illustrating the main part of compression processing according to the first embodiment;

FIG. 5G is a diagram illustrating an example of a reduced-color image according to a third embodiment of the present invention;

DESCRIPTION OF THE EMBODIMENTS

Preferred embodiments of the present invention will now be described in detail in accordance with the accompanying drawings.

First Embodiment

Figure 8:
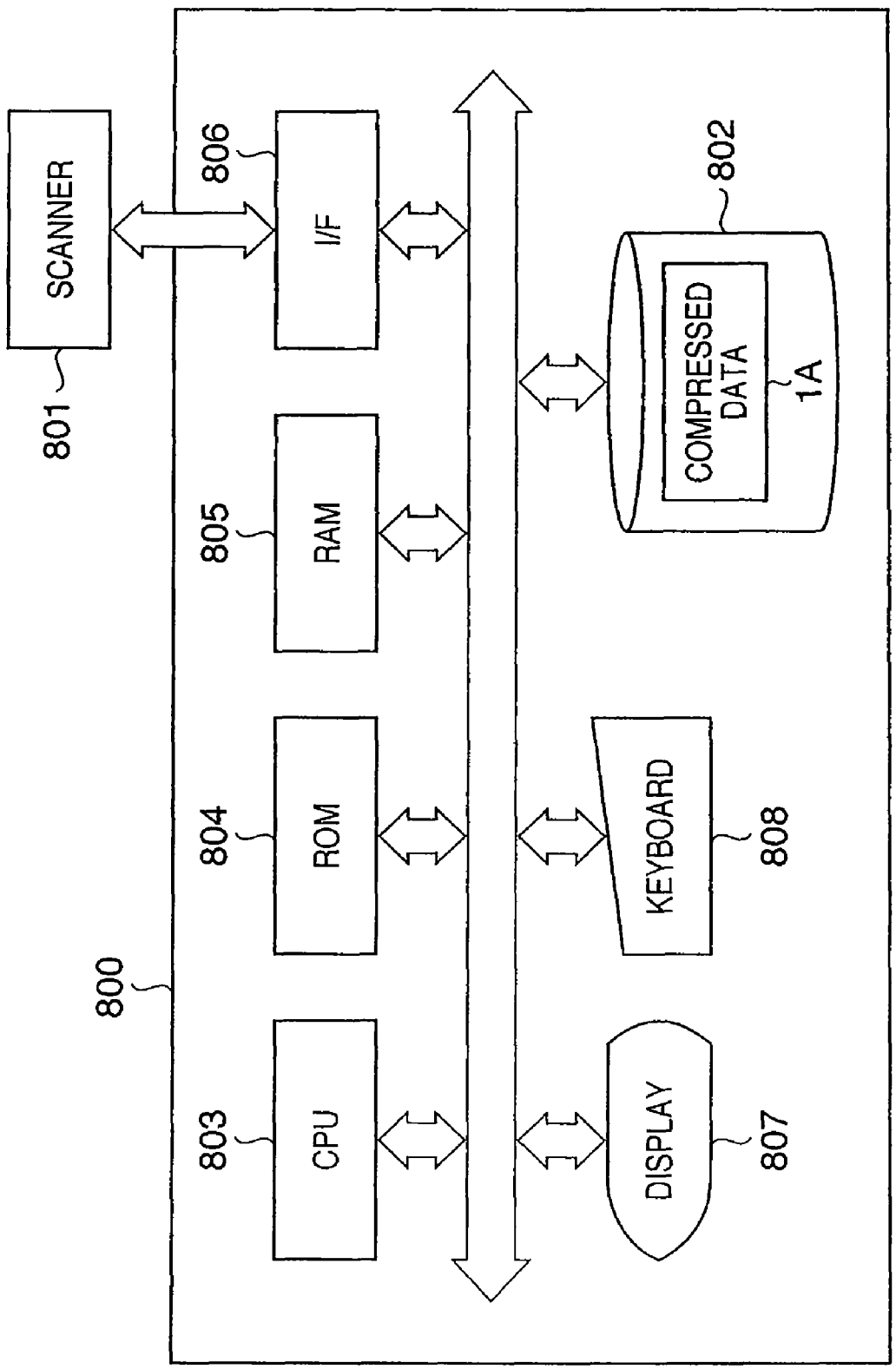
FIG. 8 is a block diagram illustrating the structure of a document filing apparatus, which is one form of the present invention.

FIG. 8 is a block diagram illustrating the structure of a document filing system, which is one form of the present invention. An information processing apparatus 800 applies compression processing, described below, to a document image (original image) read in from a scanner 801 via an interface 806, and stores the compressed image in a storage unit 802 (a hard disk in this example) as compressed data 1A. A CPU 803 executes various processing based upon a control program and data that have been stored in a ROM 804 or RAM 805. A display 807 presents a variety of displays under the control of the CPU 803. For example, the display 807 provides various GUIs when document filing is performed. A keyboard 808 is used to input various commands to the CPU 803. A pointing device (not shown) may be used as the device for inputting commands from the user, and a keyboard and pointing device may be used in combination.

Figure 1:
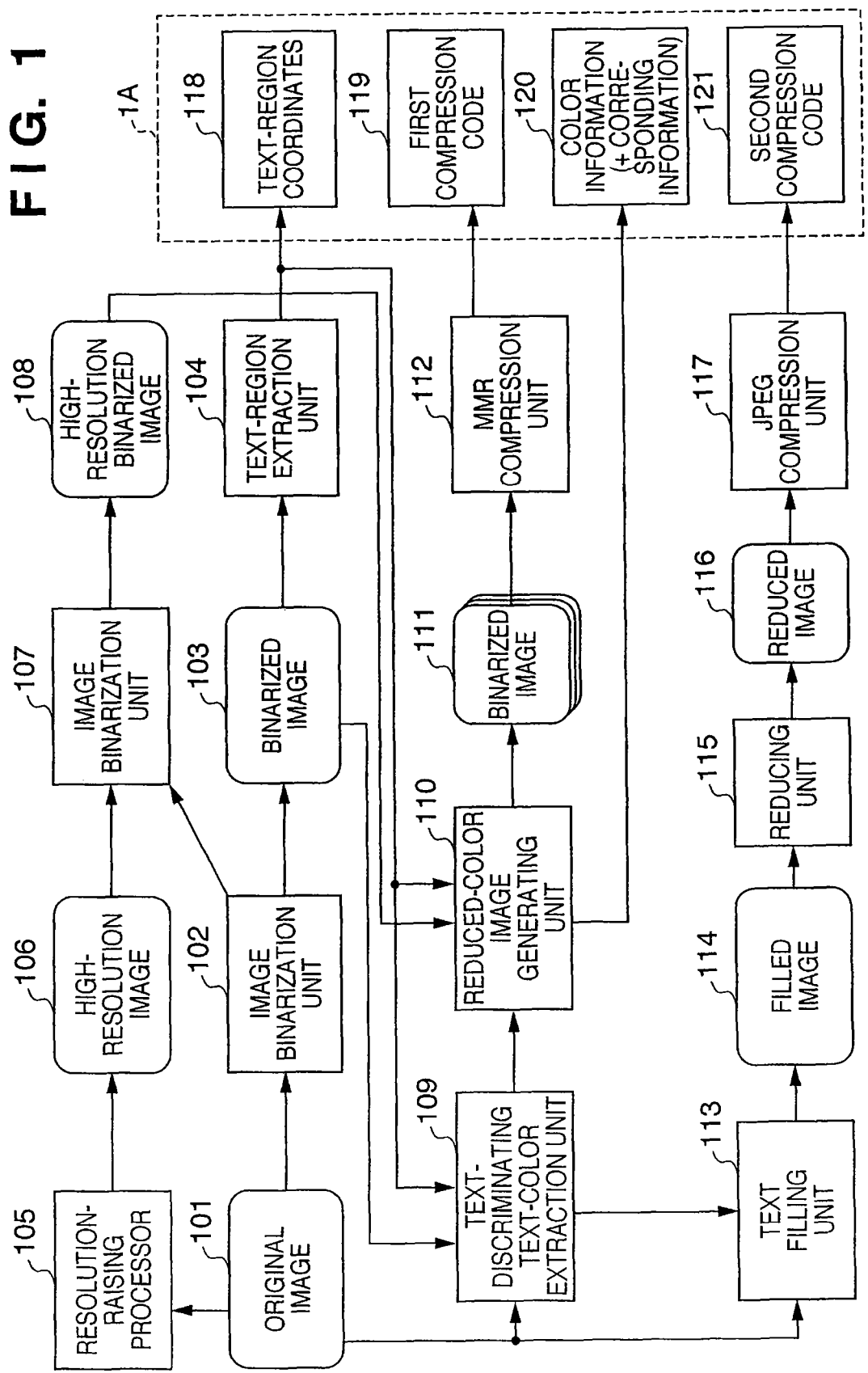
FIG. 1 is a functional block diagram illustrating image compression processing according to a first embodiment of the present invention.

In the implementation described above, the information processing apparatus 800 functions as an image processing apparatus that executes compression processing illustrated in FIG. 1. A general-purpose computer such as a personal computer can be used as the information processing apparatus 800. Alternatively, the document filing apparatus may be implemented using a multifunction peripheral (MFP), and the functions of the image processing apparatus described below may be realized by a multifunction peripheral.

FIG. 1 is a block diagram useful in describing image compression processing executed by the image processing apparatus according to the first embodiment. In FIG. 1, the image compression processing described here is applied to an original image 101. An image binarization unit 102 binarizes the original image 101 and obtains a binarized image 103. A text-region extraction unit 104 detects a text region from the binarized image 103 and creates text-region coordinates 118.

A resolution-raising processor 105 subjects the original image 101 to processing for raising the resolution thereof, thereby generating a high-resolution image 106. An image binarization unit 107 subjects the high-resolution image 106 to binarization processing, thereby generating a high-resolution binarized image 108.

The text-region coordinates 118 produced by the text-region extraction unit 104 are input to a text-discriminating text-color extraction unit 109. The latter extracts (executes text discrimination of) black portions in the text region of the binarized image 103 as text portions based upon the text-region coordinates 118 and computes the colors of the original image 101 that correspond to these text portions. The text-discriminating text-color extraction unit 109 thus generates the position of a text portion and the color information thereof. A reduced-color image generating unit 110 creates binarized images 111, which have been partitioned into color units after color reduction, by referring to the text-region coordinates 118, the color information of the text and the high-resolution binarized image 108. Since a binarized image of every color is thus created, high-resolution binarized images the number of which is the same as the number of text colors after color reduction are created. The reduced-color image generating unit 110 performs color reduction by classifying each text color obtained by the text-discriminating text-color extraction unit 109 into any color of a prescribed number of colors. The reduced-color image generating unit 110 generates the binarized images 111 of the text region for every color-reduced text color using the high-resolution binarized image 108 (the details will be described later with reference to the flowcharts of FIGS. 3 and 4). Further, the reduced-color image generating unit 110 generates color information 120 that correlates each binarized image 111 and color obtained after color reduction. The high-resolution binarized images 111 generated for every color after color reduction are input to an MMR compression unit 112, which applies MMR compression (reversible compression of binarized images) to each binarized image and generates first compression code 119.

The original image 101 and information indicating the text portion from the text-discriminating text-color extraction unit 109 are input to a text filling unit 113, which proceeds to specify the text portion of the original image 101. The text filling unit 113 fills the specified text portion with a pixel value other than that of the text portion (e.g., with the color of the pixels surrounding the text portion) and generates an image 114 in which the text portion is filled. A reducing unit 115 reduces (lower the resolution of) the image 114 and produces a reduced image 116. A JPEG compression unit 117 subjects the reduced image 116 to JPEG compression and produces second compression code 121. The result of combining the text-region coordinates 118, first compression code 119, color information 120 and second compression code 121 is the compressed data 1A.

Figure 4:
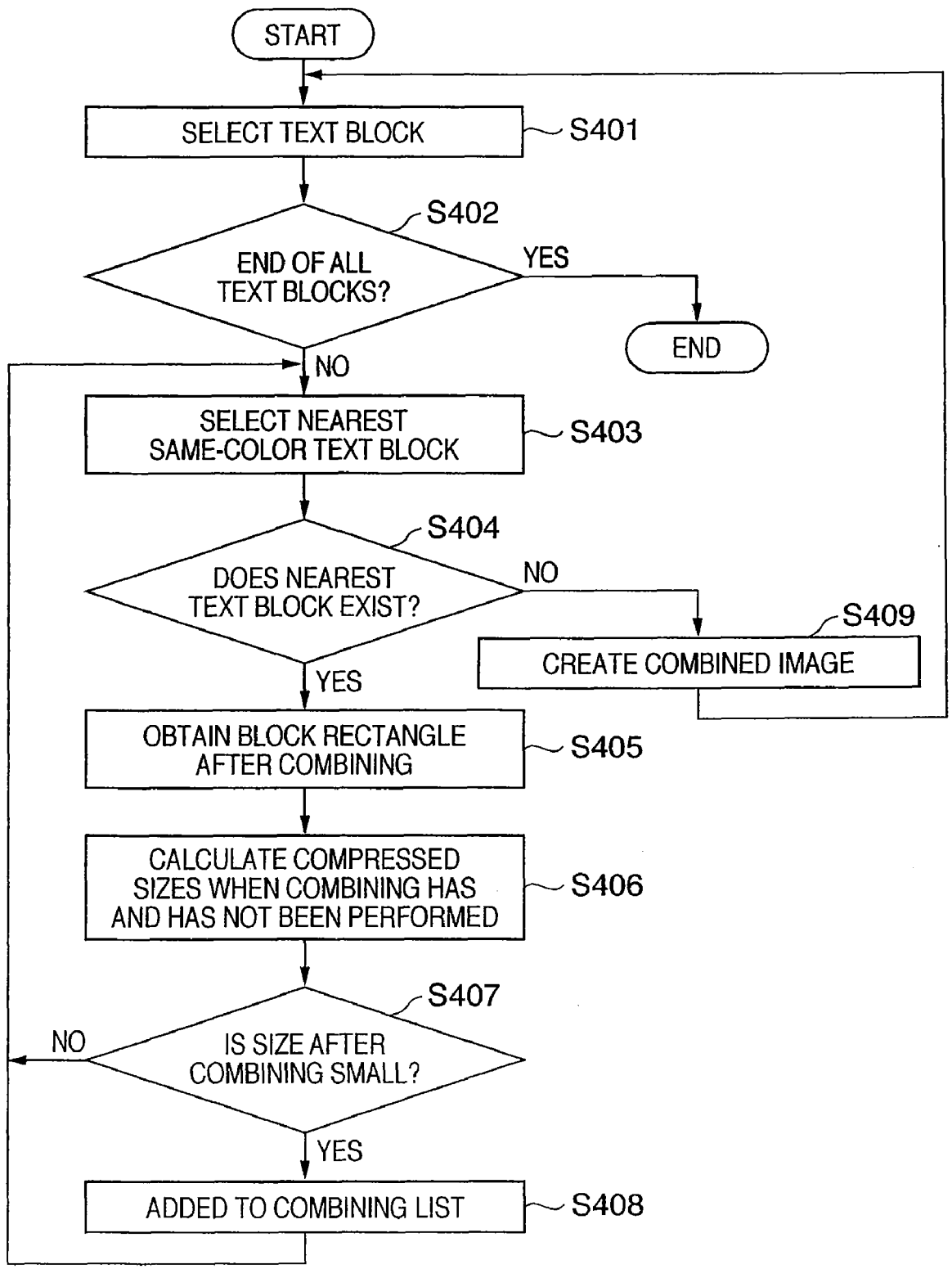
FIG. 4 is a flowchart useful in describing processing for creating a reduced-color image in compression processing according to the first embodiment.

The operation illustrated in FIG. 1 will be described further with reference to FIG. 3, FIG. 4 and FIGS. 5A to 5F. FIG. 3 is a flowchart illustrating the main part of compression processing according to the this embodiment, FIG. 4 is a flowchart useful in describing processing for creating a reduced-color image in compression processing according to this embodiment, and FIGS. 5A to 5F are diagrams illustrating an example of image processing according to the first embodiment.

Figure 5A:
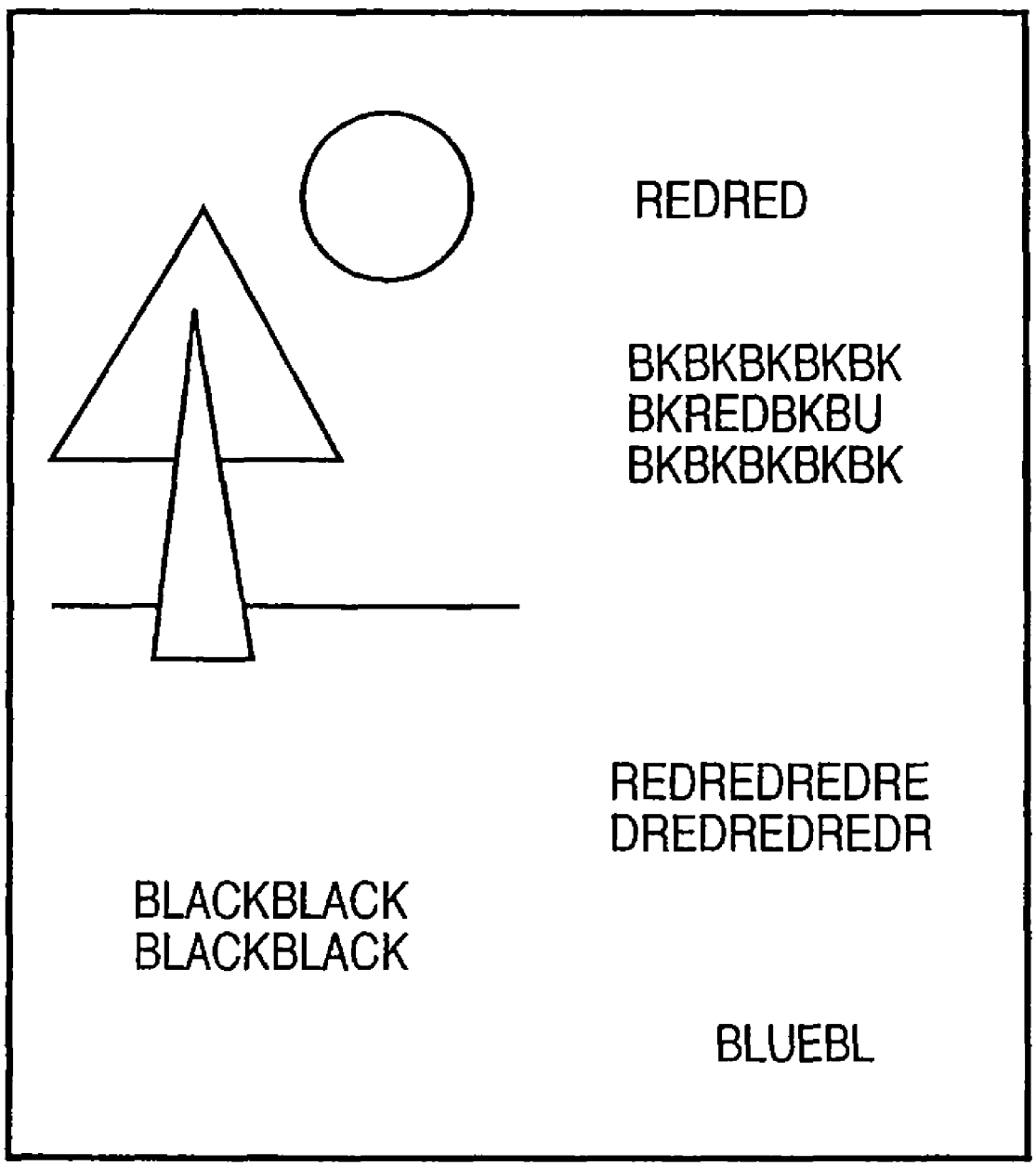
FIG. 5A is a diagram illustrating an example of an original image for describing image processing according to the first embodiment.
Figure 5B:
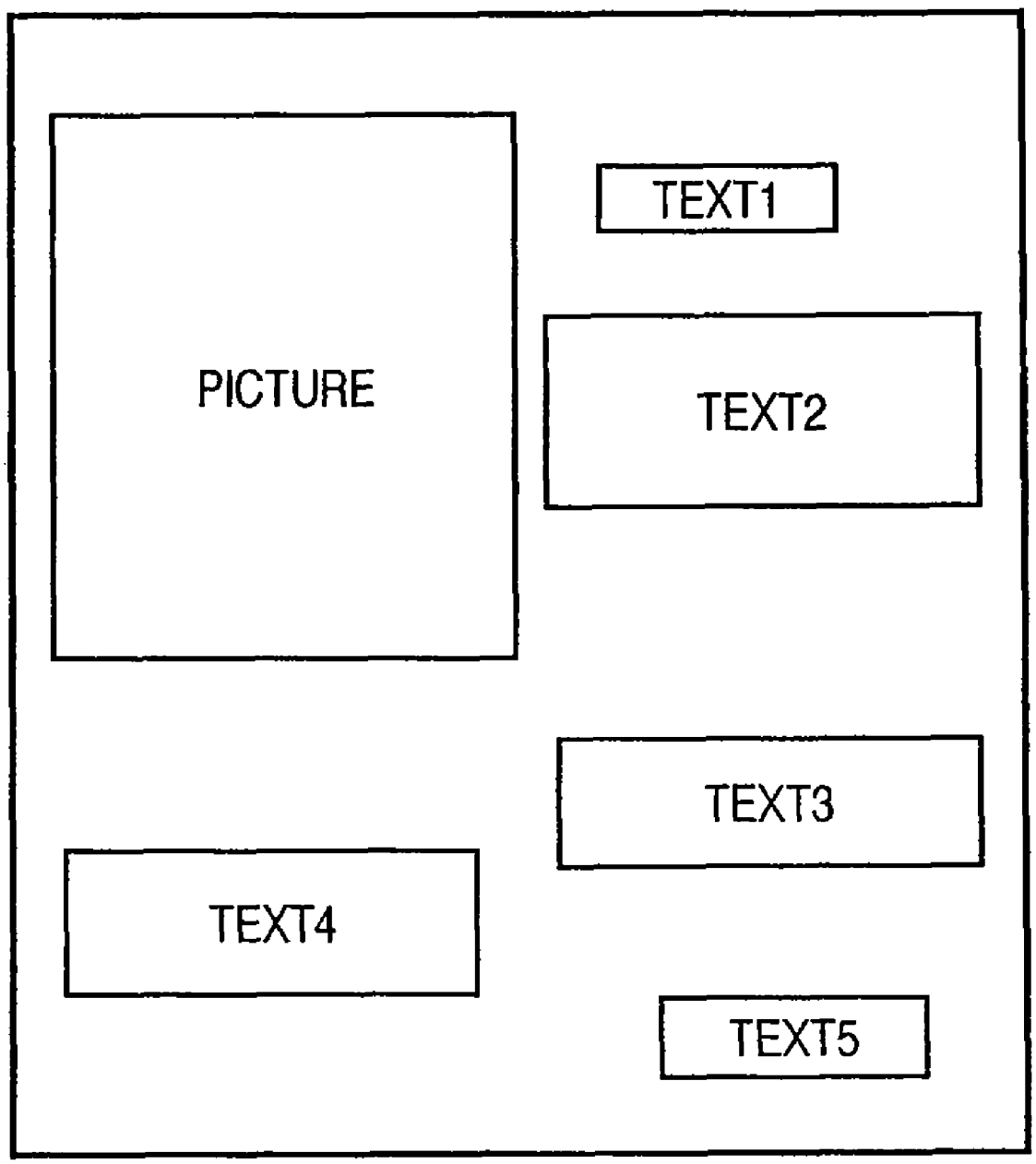
FIG. 5B is a diagram illustrating an example of result of area discrimination processing applied to the original image of FIG. 5A.

At step S301 in FIG. 3, the original image 101 is read in from the scanner 801. The image illustrated in FIG. 5A will be described as the image read in. The image binarization unit 102 creates the binarized image 103 at step S302 from the image input at step S301. The binarization processing at step S302 (in the image binarization unit 102) may be any binarization method, such as a manner similar to error-diffusion binarization processing, so long as it is not a method of expressing density of an image by pixel density. Image quality after compression will be better if a method of performing binarization (optimum binarization) conforming to the image is adopted, examples of which are described in Japanese Patent Laid-Open No. 08-221512, U.S. Pat. No. 3,106,080 and Japanese Patent Laid-Open No. 2005-071088. Next, at step S303, the text-region extraction unit 104 subjects the binarized image 103 to area discrimination, separates the image into text regions (also referred to as "text blocks") and non-text regions, as illustrated in FIG. 5B, and acquires the text-region coordinates 118.

At step S304, the text-discriminating text-color extraction unit 109 extracts text portions (unit characters) and text color for every text region extracted at step S303. For example, as described in Japanese Patent Laid-Open No. 2004-128880, the text-discriminating text-color extraction unit 109 computes the color of every unit character contained in a text region, thereby deciding a representative text color within each text region. In the examples of FIGS. 5A and 5B, the regions of TEXT1 and TEXT3 are discriminated as text regions (text blocks) composed of the color red, and the region of TEXT2 is discriminated as a text region (text block) composed of the three colors black, red and blue. The region of TEXT4 is discriminated as a text region (text block) composed of the color black, and the region of TEXT5 is discriminated as a text region (text block) composed of the color blue. It should be noted that a text region (e.g., TEXT2) discriminated as containing a plurality of colors is separated into color-by-color text blocks at step S308, described later. Further, in a case where text colors that exceed a predetermined number are detected (e.g., a case where gradation has been applied to text), it is judged that this portion is not suited to MMR compression and is treated as a non-text portion. A non-text portion is compressed by the JPEG compression unit 117.

Figure 5C:
FIG. 5C is a diagram useful in describing segmentation processing applied to text blocks that contain characters of a plurality of colors.
Figure 5D:
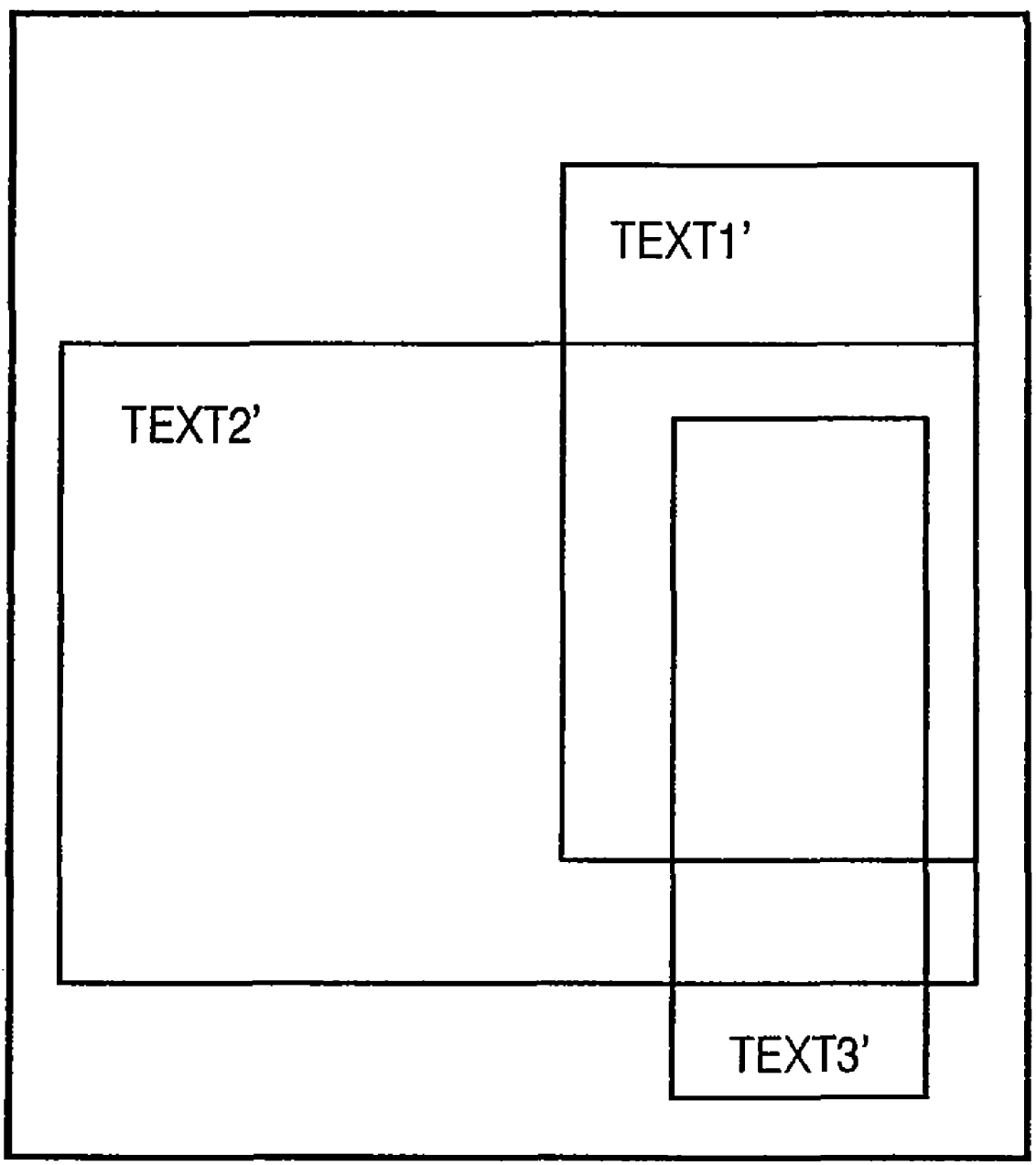
FIG. 5D is a diagram illustrating the result of combining text blocks.

Next, at step S305, the text filling unit 113 obtains the positions of pixels of the text portions based upon the binarized image 103 and fills in pixels corresponding to these text portions from the original image 101 (a color image) with the color of the surrounding pixels, thereby producing the image 114 in which the text portions are filled. As a result, an image in which a non-text portion remains, as illustrated for example in FIG. 5F, is obtained as the image 114 in which the text portions are filled. When the processing of step S305 is completed, the binarized image 103 is no longer necessary and may be discarded. At step S306, the image obtained from the original image 101 by filling in the text portions is subjected to multivalued compression by JPEG compression unit 117. It should be noted that it may be so arranged that in a case where the resolution of the filled image 114 is greater than a predetermined value, the reduced image 116 is produced by execution of reduction processing using the image reducing unit 115 and the reduced image is input to the JPEG compression unit 117. The second compression code 121 is thus obtained at step S306.

The high-resolution binarized image 108 is generated from the original image 101 at step S307. In this processing the resolution-raising processor 105 raises the resolution of the entered original image 101 using bi-cubic or linear interpolation and generates the high-resolution image 106. In accordance with this processing for raising resolution, which includes such interpolation processing, the readability of the text images can be improved, unlike the case where an image is simply enlarged. The high-resolution image 106 thus created is binarized by the image binarization unit 107, whereby the high-resolution binarized image 108 is obtained. In this embodiment, a threshold determination method used in the binarization processing by the image binarization unit 102 and a threshold determination method used in the binarization processing by the image binarization unit 107 employ the same method (e.g., a binarization threshold determination method using a histogram) in order to prevent the binarized image 103 and the high-resolution binarized image 108 from becoming images that are very different from each other.

By using the binarization threshold information computed by the image binarization unit 102, the image binarization unit 107 need not calculate a binarization threshold value from the high-resolution image. Band processing therefore becomes possible in the processing by the resolution-raising processor 105 and image binarization unit 107. This means that the high-resolution image 106 need not be held in memory in its entirety; rather, only a portion of the image need be held in memory. This conserves memory. More specifically, if the image binarization unit 102 employs a method based entirely on a single threshold value, then the image binarization unit 107 also uses this single threshold value. On the other hand, if the image binarization unit 102 employs a method that uses a threshold value adaptively on a per-region basis, then the image binarization unit 107 uses this threshold value for every corresponding region of the high-resolution image 106. It should be noted that the image resolution of the high-resolution binarized image 108 is decided beforehand in accordance with the resolution of the original image 101. In this embodiment, the high-resolution binarized image 108 is a 300-dpi image, 300-dpi image and 400-dpi image if the original image 101 is 100 dpi, 150 dpi and 200 dpi, respectively. Of course, such a setting is only one example.

From step S308 onward, the binarized image 111 is produced by the reduced-color image generating unit 110 for every color obtained by color reduction, and the binarized images 111 are subjected to compression processing by the MMR compression unit 112. It should be noted that in order to produce the binarized images 111, use is made of the high-resolution binarized image 108 obtained at step S307, the text-region coordinates 118 obtained at step S303 and the character portions (positions) and character colors of each text block obtained at step S304. First, at step S308, a region discriminated as a text portion of a plurality of colors at step S304 is separated color by color. For example, the region of TEXT2 is separated into each color discriminated as shown in FIG. 5C. In this example, the black portion in the region TEXT2 is partitioned into TEXT6, and red portion into TEXT7 and the blue portion into TEXT8.

At step S309, the text blocks of every character color extracted at steps S304 and S308 are compared and same-color text blocks are discriminated. Furthermore, text blocks discriminated as being of the same color are grouped and character color with respect to grouped text blocks is decided anew. The grouped text blocks are combined group by group at step S310, as will be described later, whereby a plurality of binarized images are produced. The new character color decided with respect to each group is stored as the color information 120 correlated with the binarized image subjected to MMR compression at step S310. Further, the new character color is determined based upon the color of the text block that belongs to each group. For example, it may be a color used as a reference when performing the same-color discrimination, or it may be an average color of the grouped text blocks.

An example of a method of same-color discrimination is to subject eight bits of each of R, G, B to color reduction to a predetermined color range of two bits or three bits of each of R, G, B and perform grouping depending upon whether colors are the same or not. To what extent color reduction is performed is decided depending upon to what extent the compressed image possesses gradation. For example, it may be so arranged that R, G, B is made two bits, two bits and one bit, respectively, or 3 bits, 3 bits and two bits, respectively, utilizing the fact that the sensitivity of the human eye to the color blue is weak. Further, in a case where it is desired to perform same-color discrimination more accurately, it is preferred that a conversion be made to the YUV format or LAB format, in which color difference is easier to compare, instead of using the RGB format, and that grouping be performed upon rounding to two bits or three bits.

Figure 5E:
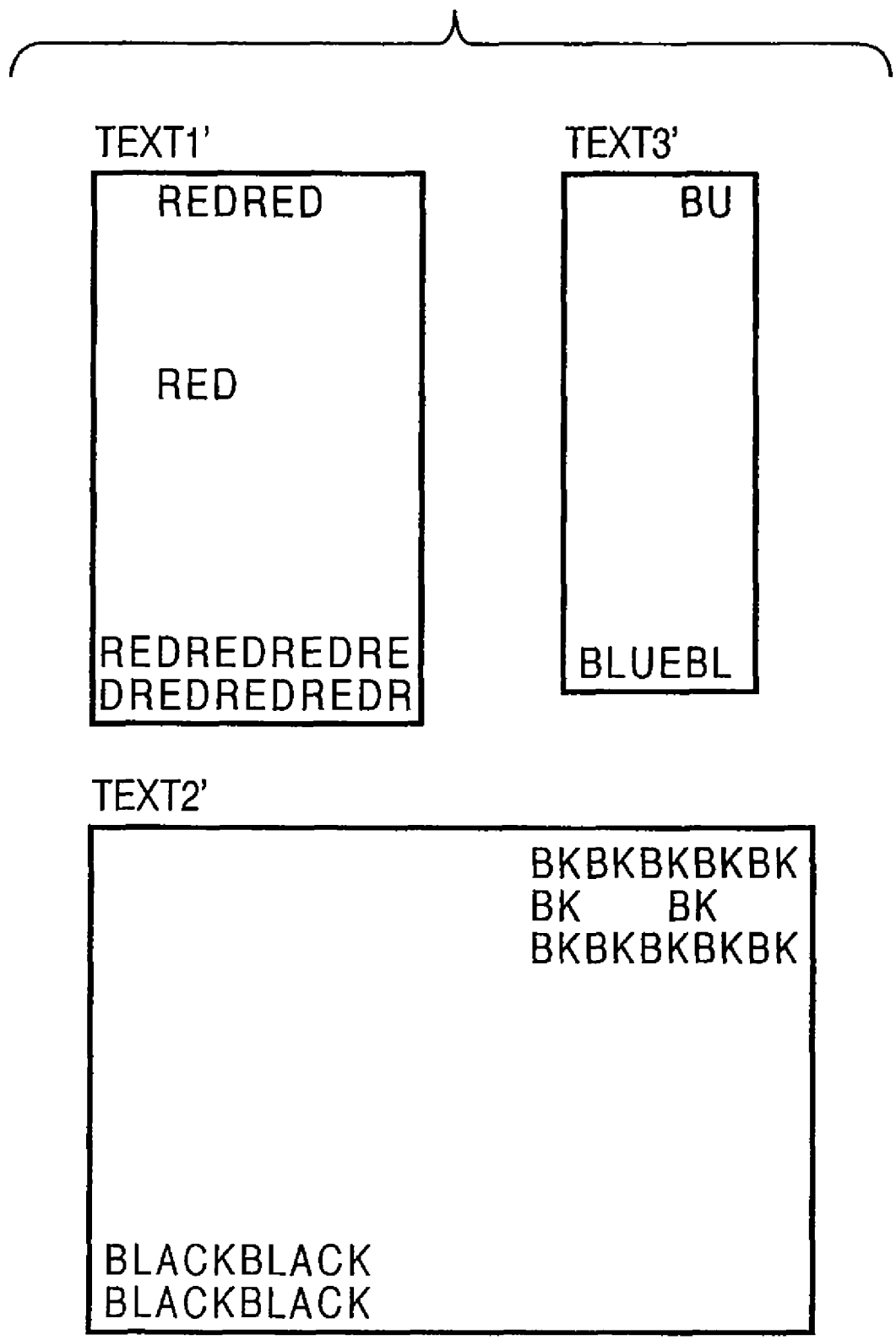
FIG. 5E is a diagram illustrating an example of images of connected text blocks.
Figure 5F:
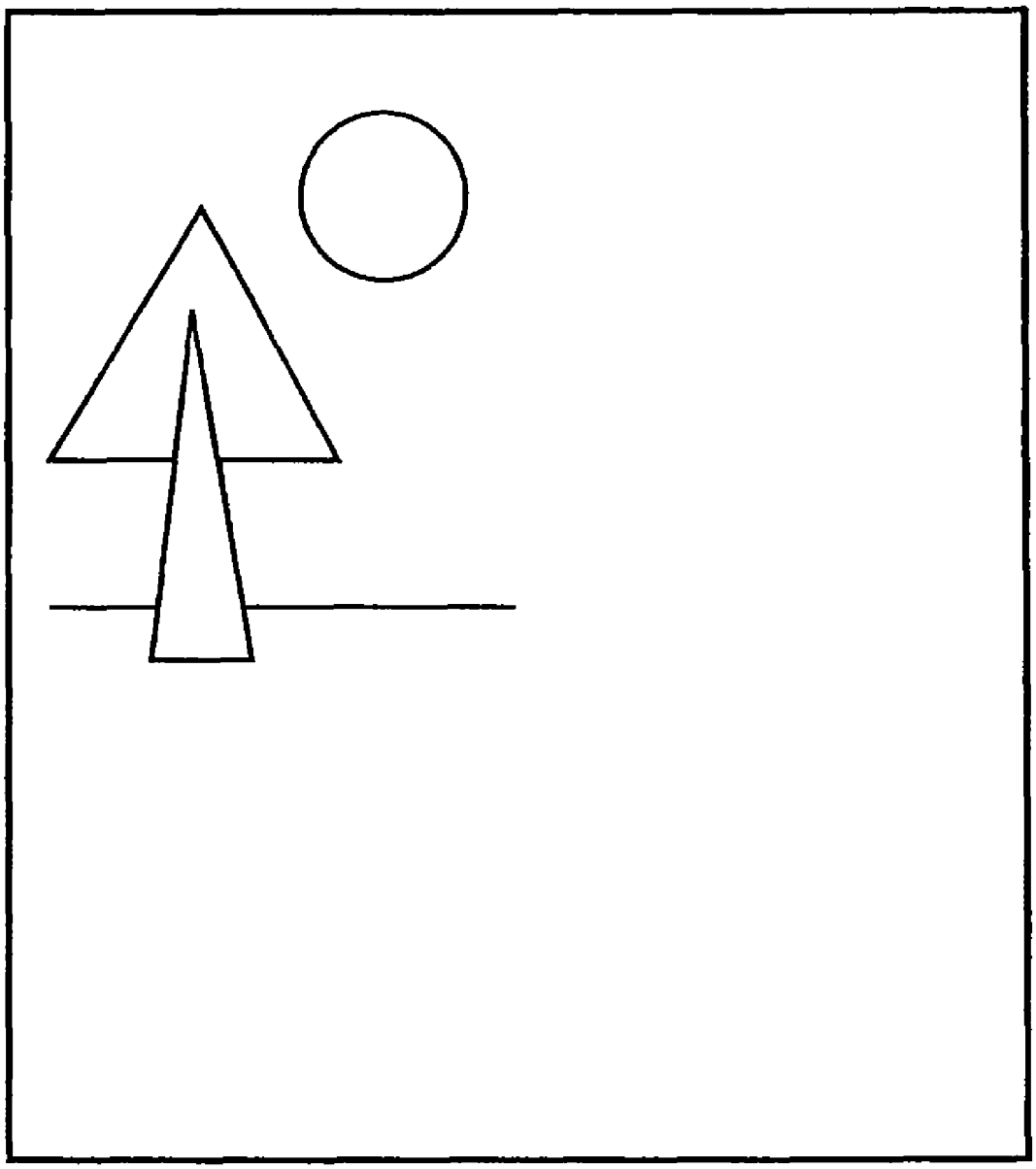
FIG. 5F is a diagram illustrating an image (a background image) after the filling of text portions.

At step S310, the images of the text blocks judged to be of the same color at step S309 are combined to create new binarized images 111 of the kind shown in FIG. 5E. The positions of the created plurality of binarized images 111 (TEXT1', TEXT2', TEXT3') in the original image are the positions shown in FIG. 5D. It should be noted that the created binarized images 111 are output in such a manner that they can be correlated with the color information 120 decided at step S309. Further, in a case where combining processing is executed and a change occurs in the text-region coordinates 118, the text-region coordinates 118 are updated. As mentioned above, the binarized images 111 become as shown in FIG. 5E, each binarized image is subjected to compression processing by the sequential MMR compression unit 112 and the first compression code 119 is produced.

At step S311, the compressed data 1A, which is obtained by combining the four items of data set forth below obtained by the foregoing processing, is output. The compressed data 1A includes the following:

(1) the text-region coordinates 118 acquired at step S303 and updated as necessary at step S310;

(2) the first compression code 119 obtained at step S310;

(3) the color information 120 obtained at step S309; and (4) the second compression code 121 obtained at step S306.

FIG. 4 is a flowchart illustrating the details of the processing for combining images at step S310 in FIG. 3.

At step S401, one text block serving as a reference is selected from among the text block groups judged to be of the same color at step S309. If there is no text block to be selected ("YES" at step S402), then it is construed that processing regarding all text blocks has ended and processing is exited. On the other hand, if a text block has been selected at step S401, then control proceeds from step S402 to step S403. At step S403, from text blocks having the same color as that of the text block (the selected block) that will serve as the reference, the text block nearest to the this reference text block is found and is selected as a block to be combined. The reason why this nearby text block is adopted for combination is that the size of a binarized image combined in a case where a new binarized image is created by combining two blocks will be small and, as a result, it is expected that if compression is applied, the size after compression can be suppressed.

At step S404, it is determined whether a text block could be selected by the selection processing of step S403. If a text block could be selected, then control proceeds to step S405. At step S405, a rectangle in a case where the reference text block and the text block selected at step S403 have been combined is obtained. Size after compression in a case where the above-mentioned combining has been performed and in a case where it has not been performed is calculated at step S406. Although a method of actually performing compression and calculating accurate size also may be used at step S406, it may be so arranged that compressed size is calculated by the simple method set forth below. If this method is used, the accuracy of the compressed size declines but processing time can be shortened. It should be noted that the method set forth below is an example of a simple method of calculating compressed size; the invention is not limited to this method of calculation.

With this simple method of calculating compressed size, a compression rate A of a text portion measured in advance is used. By using this compression rate A, size in a case where partitioning and compression have been performed is as follows:

$$\text{partitioned compressed size} = (\text{area of TEXT1} + \text{area of TEXT2}) \times A + (\text{header size}) \times 2$$

In a case where combining and compression have been performed, on the other hand, a gap portion between two text blocks and blank portions within the blocks become connected and a large gap portion is produced. Since this gap portion has no data, it can be compressed at a very high compression rate in comparison with a case where a text portion is compressed as usual. Accordingly, combined and compressed size is reduced based upon the gap portion after combining. The amount of data reduced by the gap portion is found in simple fashion using a predetermined constant B. That is, by using the compression rate A and the constant B, size in a case where combining and compression have been performed becomes as follows:

$$\text{combined compressed size} = (\text{area of TEXT portion after combining}) \times A - (\text{area of gap portion}) \times B + (\text{header size})$$

The compressed sizes calculated as set forth above are compared at step S407. That is, compressed size in a case where images are combined and compressed size in a case where images are not combined are compared. If size will be large in a case where images are combined, then the images are not combined, control returns to step S403 and the next text block is found. If size will be small in a case where images are combined, then control proceeds to step S408 and the selected block is added to a list for performing combining of images by later processing. This is followed by repeating steps S403 to S408 until text blocks of the same color no longer exist. When there are no longer text blocks of the same color, control proceeds to step S409.

At step S409, the image obtained by combining the text blocks is produced based upon the combination list and MMR compression is carried out. Further, in a case where blocks to be combined by the processing of steps S403 to S408 no longer exist, compression is carried out using the image of an independent block as the target. Control then returns to step S401, a text block to be processed next (an unprocessed text block) is selected and the processing of steps S402 to S409 is repeated. If unprocessed blocks thus can no longer be selected, control is exited from step S402.

(Procedure of Decoding Processing)

Processing for restoring an image from the compressed data 1A, which has been obtained as set forth above, will be described next.

First, the image-compressed data of first compression code 119 and second compression code 121 is examined and the maximum resolution is acquired. The JPEG data of second compression code 121 is then decoded in conformity with the maximum resolution acquired. Each item of data of the first compression code 119 is decoded and restored in conformity with the maximum resolution by referring to the text-region coordinates 118 and color information 120.

In other words, black-pixel portions (pixels of text portions) of each binarized image obtained by decoding the first compression code 119 are replaced by a color indicated by the color information 120 (a color correlated with each binarized image) to thereby obtain the text-region image. Thereafter, the text-region image obtained by color substitution at the position indicated by the text-region coordinates 118 is written over the image obtained by decoding the second compression code 121. The image is restored from the compressed data 1A by the procedure set forth above.

Second Embodiment

Figure 6:
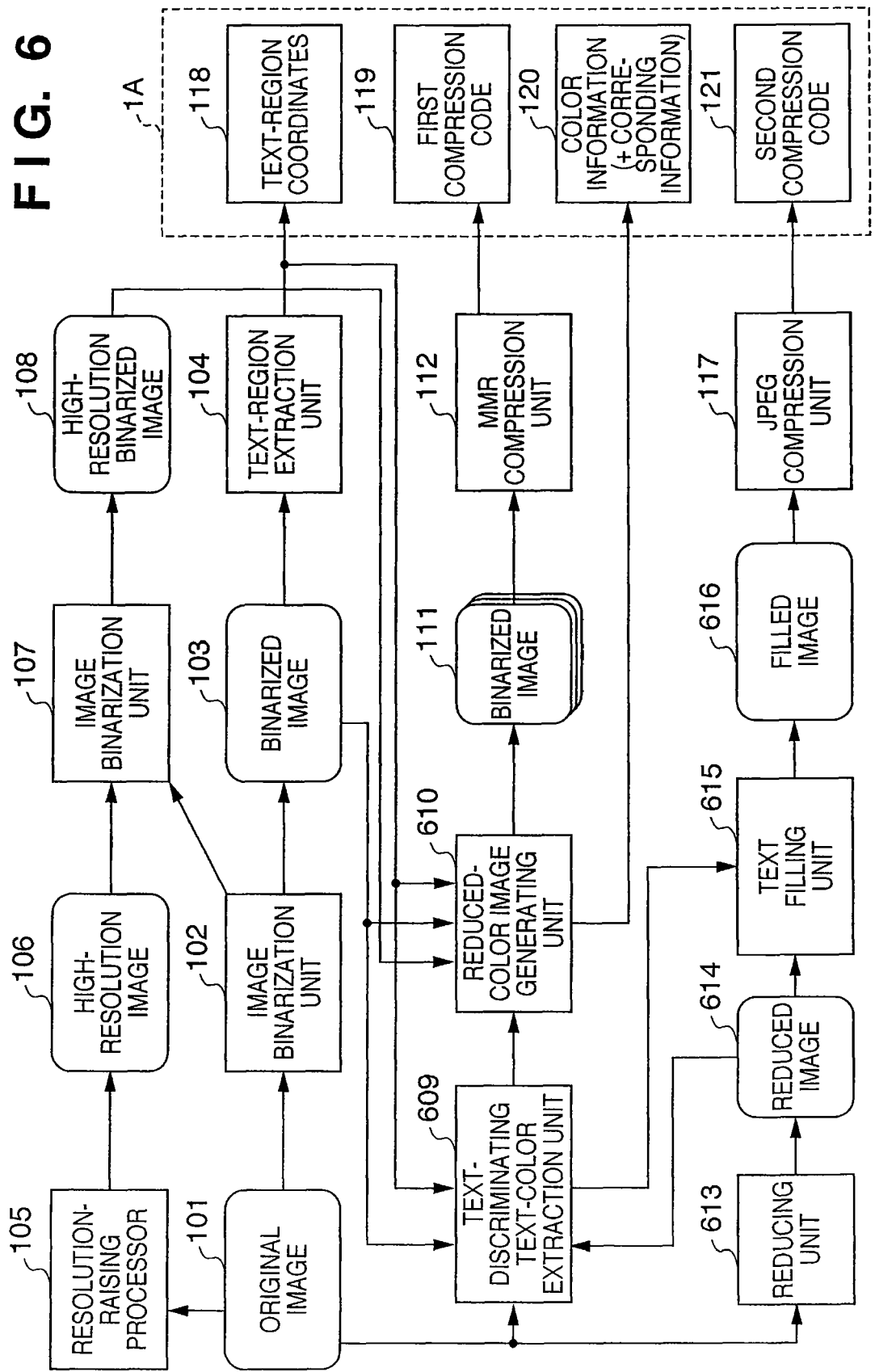
FIG. 6 is a functional block diagram illustrating image compression processing according to a second embodiment of the present invention.

In a second embodiment, a modification relating to generation of the compressed data 1A set forth in the first embodiment will now be described. FIG. 6 is a block diagram useful in describing image compression processing executed by an image processing apparatus according to the second embodiment. Functional blocks similar to those of the first embodiment (FIG. 1) are designated by like reference characters. The chief differences between this embodiment and the first embodiment are as follows:

(1) in the generation of the first compression code 119, a text-discriminating text-color extraction unit 609 utilizes a reduced image of the original image 101;

(2) in the generation of the second compression code 121, the text-portion fill-in is performed after the original image 101 is reduced; and (3) on the basis of the size of text in each text region, the reduced-color image generating unit 610 selects, for every text region, whether to use the binarized image 103, which is obtained by binarizing the original image 101, or the high-resolution binarized image 108, and generates the plurality of binarized images 111.

A reducing unit 613 subjects the original image 101 to reduction processing and generates a reduced image 614. It may be so arranged that the reduction processing by the reducing unit 613 is performed in a case where the resolution of the original image 101 is greater than a prescribed value and not performed in a case where the resolution is below the prescribed value.

The text-discriminating text-color extraction unit 609 first extracts black portions in the text region of the binarized image 103 as the positions of pixels of text portions based upon the text-region coordinates 118. Then, on the basis of the pixel positions of the text portions, the text-discriminating text-color extraction unit 609 calculates the color of the reduced image 614 at the corresponding positions and creates text color information (see Japanese Patent Laid-Open No. 2004-260327).

On the basis of the text color information generated by the text-discriminating text-color extraction unit 609, the reduced-color image generating unit 610 groups text blocks of the same color and executes combining processing, in a manner similar to that of the first embodiment, and generates the binarized images 111 and color information 120 corresponding to each text color. The reduced-color image generating unit 610 of the second embodiment makes proper use of the high-resolution binarized image 108 and binarized image 103 in accordance with the size (absence or presence of a small-size flag) of characters contained in a text region (text block). The details will be described later.

The reduced image 614 and the information indicating the character portion from the text-discriminating text-color extraction unit 609 are input to a text filling unit 615, which proceeds to specify the character portion in the reduced image 614. The text filling unit 615 fills the specified text portion with the color surrounding it and generates an image 616 in which the text portion is filled. The JPEG compression unit 117 applies JPEG compression to the reduced image 616 in which the text portion is filled, thereby generating the second compression code 121. It should be noted that it is assumed that the reducing unit 613 executes no processing whatsoever in a case where the resolution of the original image 101 is smaller than a predetermined value. In this case, the reduced image 614 becomes the same as the original image 101.

The text-discriminating text-color extraction unit 609 obtains the average value of the size of characters (e.g., the number of pixels of each character vertically and horizontally is adopted as the size of the character) contained in the text region (text block) when it extracts the text color. If the average value is smaller than a predetermined size, a small-size flag indicating this fact is added to the text-region information. The reduced-color image generating unit 610 generates the binarized images 116 using the binarized image 103, high-resolution binarized image 108, text-region coordinates 118 and the result from the text-discriminating text-color extraction unit 609. With regard to the generation of the binarized images 111 at step S310 of FIG. 3 by the processing described in FIG. 4, the reduced-color image generating unit 610 changes over the binarized image used in accordance with the absence or presence of the small-size flag. That is, the reduced-color image generating unit 610 executes processing using the high-resolution binarized image 108 with regard to a text block having the small-size flag, and executes processing using the binarized image 103 with regard to a text block that does not have the small-size flag. A text region having the small-size flag has poor text quality because the size of the characters is small. Accordingly, quality is improved by using the high-resolution binarized image 108. On the other hand, a text region not having the small-size flag has a character size greater than a certain size and therefore text image quality is maintained using the binarized image 103 as is. An increase in amount of processing is suppressed by thus utilizing the binarized image 103.

In a case where a text block having the small-size flag and a text block of the same color devoid of the small-size flag exist, whether these text blocks are to be combined is determined. As in the first embodiment, this determination may be made by computing the compressed size in a case where combining is not carried out and the compressed size in a case where combining is carried out. The compressed size in a case where combining is carried out is computed taking into consideration the resolution of the high-resolution binarized image. In a case where it is determined to combine the text blocks, the binarized images 111 are produced using the high-resolution binarized image 108 with respect to the text block after combining. If this arrangement is adopted, then, when the binarized images 111 are produced with respect to each of the text blocks, whether the binarized image 103 or the high-resolution binarized image 108 is to be used can be selected appropriately based upon character size. As a result, a high compression effect is obtained.

It will suffice if the combining processing is executed as set forth below. First, a group of text blocks having the small-size flag and a group of text blocks devoid of the small-size flag are each separately classified into groups of the same color. A text block having the small-size flag requires the high-resolution binarized image 108, while a text block devoid of the small-size flag is a portion in which the binarized image 103 suffices.

Next, whether text blocks belonging to a group of the same color are to be combined or not is determined. Unlike FIG. 4 of the first embodiment, first the state of overlap between two rectangular regions is compared. If the rectangular region having the small-size flag encompasses the rectangular region devoid of the small-size flag, then it is added to the combination list and control is exercises so as to use the high-resolution binarized image 108.

It should be noted that if a region having the small-size flag and a region not having this flag have been combined, then the combined region is treated as a combined region having the small-size flag. Further, in a case here regions having the small-size flag have been combined, the combined region is treated as one having the small-size flag; in a case where regions not having the small-size flag have been combined, the combined region is treated as one not having the small-size flag.

On the other hand, in a case where the rectangular region having the small-size flag does not encompass the rectangular area not having the small-size flag, the combined compressed size and the uncombined compressed size are calculated and whether combining is to be performed or not is determined in a manner similar to that of the first embodiment.

By way of example, if text blocks to be combined are a text block having the small-size flag and a text block not having the small-size flag, then the following equations hold:

partitioned compressed size=(area of TEXT portion with flag)×$A$+(area of TEXT portion without flag)×$C$+(header size)×2 combined compressed size=(area of TEXT portion after combining)×$A$−(area of gap portion)×$B$+(header size)

Here it is assumed that the area of each TEXT portion is a value the basis of which is a high-resolution binarized image. When only the TEXT portion without the flag is compressed at this time, a low-resolution binarized image can be used. The compression rate C, therefore, employs a value smaller than the compression rate A, taking into consideration this resolution as well.

It should be noted that the first compression code is a mixture of high- and low-resolution binarized images. However, when the created compressed data 1A is decoded, reproduction is performed at the resolution that conforms to the high-resolution binarized image. Ideally, if the high-resolution binarized image is made an image having a resolution which is a integer multiple of (e.g., double) the low-resolution binarized image (having the resolution of the original image) in each of the horizontal and vertical directions, then a resolution conversion can be made in simple fashion.

In accordance with the second embodiment, as described above, a high-resolution binarized image is not always used with respect to a text region. Rather, use is made of a binarized image having a suitable resolution in accordance with character size. This makes it possible to conserve memory. Further, since text-color extraction is performed using the reduced image 614, the original image 101, which occupies a large amount of memory, is discarded early, thereby enabling conservation of memory. It should be noted that in a case where there is surplus memory, text-color extraction may be performed from the original image 101 in a manner similar to that of the first embodiment.

(Procedure of Decoding Processing)

Decoding processing for restoring an image from the compressed data 1A in the second embodiment is similar to that of the first embodiment.

In the first and second embodiments, any JPEG method may be selected for JPEG compression, such as JPEG 2000, so long as it is processing that is capable of compressing a multivalued image at a high compression rate. Further, any method may be used as the method of compression in the MMR compression unit 112, such as ZIP or JBIG, so long as the method has a reversible high compression rate.

Third Embodiment

Figure 7:
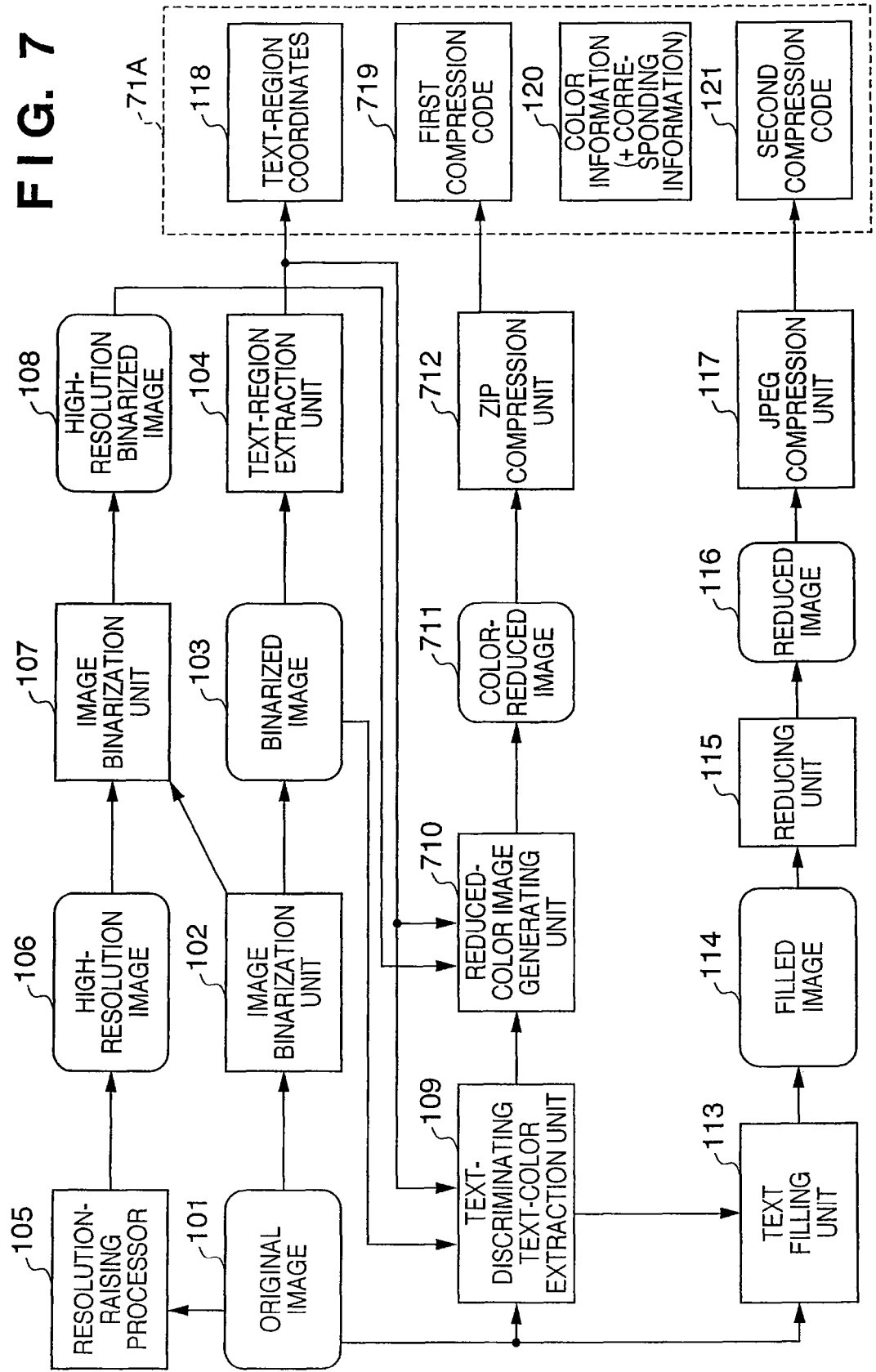
FIG. 7 is a functional block diagram illustrating image compression processing according to the third embodiment.

In the first and second embodiments described above, the plurality of binarized images 111 are produced by gathering text-portion images in units of identical color, and compression is applied to each image. However, compression may be executed with a pallet-color image without performing separation (see Japanese Patent Laid-Open No. 2002-077633). Such compression processing will be described in the third embodiment. This embodiment differs from the first embodiment in that, as shown in FIG. 7, a reduced-color image generating unit 710 generates a single color-reduced image 711 rather than a plurality of binarized images 111, and in that a ZIP compression unit 712 is provided instead of the MMR compression unit 112.

The reduced-color image generating unit 710 creates the color-reduced image 711 using the high-resolution binarized image 108, text-region coordinates 118 and the result from the text-discriminating text-color extraction unit 109. Processing for generating the color-reduced image 711 by the reduced-color image generating unit 710 will be described next.

In the examples of FIGS. 5A and 5B, there are five text blocks TEXT1 to TEXT5 and three text colors, namely black, red and blue. If a transparent color that represents portions not having text is added to these colors, then the total of colors will be four. One pixel can be expressed by two bits. Using the high-resolution binarized image 108, text-region coordinates 118 and color information 120, the reduced-color image generating unit 710 creates 1-pixel, 2-bit partial images composed only of text portions in the manner shown in FIG. 5G. The values of the two bits are pallet numbers referred to by the color information. In this example, the setup is as follows: 0: transparent, 1: black, 2: red, 3: blue.

The color-reduced image 711 created is subjected to compression processing by the ZIP compression unit 712, whereby first compression code 719 is created. The final compressed data is compressed data 71A, which is obtained by combining the text-region coordinates 118, first compression code 719, color information 120 and second compression code 121.

(Decoding Processing)

The procedure for restoring an image from the compressed data 71A is as follows: First, the image-compressed data of first compression code 719 and second compression code 121 is examined and the maximum resolution is acquired. The JPEG data of second compression code 121 is then decoded in conformity with the maximum resolution acquired, and a background image is obtained. The data of the first compression code 719 is decoded in conformity with the acquired maximum resolution by referring to the text-region coordinates 118 and color information 120, whereby a text image is obtained. Portions of this text image other than the transparent pallet are colored in accordance with the colors (pallet) indicated by the color information 120, and this is written over the background image in accordance with the position information of the text-region coordinates 118.

In accordance with the first to third embodiments, as described above, an original low-resolution image (FIG. 2A) is raised in resolution (subjected to a resolution conversion) in relation to text regions to thereby create a high-resolution image (FIG. 2F), and this is binarized to obtain a binarized image (FIG. 2G). By thus using the image (FIG. 2G) of increased resolution instead of images (FIGS. 2B, 2C) obtained by binarizing the original image, an easily readable image can be obtained even following compression and expansion. Since an image of increased resolution is handled, the size of the image is increased. However, owing to the fact that the image is a color-reduced image and not a full-color image, and by using an image of increased resolution with regard only to image portions that are originally of low resolution or contain small characters, the amount of increase in image size can be kept small. Accordingly, highly compressed image data that makes it possible to restore a highly readable image can be obtained. That is, even if an image is a low-resolution image or an image of small characters, the image can be compressed at a high compression rate without sacrificing text quality.

In the foregoing embodiments, the resolution-raising processor 105 raises the resolution of the overall original image. However, it may be so arranged that resolution is raised only with respect to text regions extracted by the text-region extraction unit 104. Further, the compression processing in the foregoing embodiments is implemented by having the CPU 803 execute a prescribed control program. However, it goes without saying that it may be so arranged that some of this processing is implemented by hardware circuitry.

In accordance with the present invention, it is possible to compress an image at a high compression rate while the readability of text in document images in which image resolution is low or in which the size of characters is small is improved.

Other Embodiments

The present invention includes a case where the functions of the foregoing embodiments are attained also by supplying a software program directly or remotely to a system or apparatus, reading the supplied program codes with a computer of the system or apparatus, and then executing the program codes. In this case, the program supplied is a program corresponding to the flowcharts illustrated in the drawings of the embodiments.

Accordingly, since the functional processing of the present invention are implemented by computer, the program codes per se installed in the computer also implement the present invention. In other words, the present invention also covers a computer program per se that is for the purpose of implementing the functional processing of the present invention.

In this case, so long as the system or apparatus has the functions of the program, the form of the program, e.g., object code, a program executed by an interpreter or script data supplied to an operating system, etc., does not matter.

Examples of recording media for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and a download can be made from the website to a recording medium such as a hard disk. In this case, the program downloaded may be a compressed file that contains automatically installable functions. Further, implementation is possible by dividing the program codes constituting the program of the present invention into a plurality of files and downloading the files from different websites. In other words, a WWW (World Wide Web) server that downloads, to multiple users, the program files that implement the functional processing of the present invention by computer also is covered by the scope of the present invention.

Further, it is also possible to encrypt and store the program of the present invention on a storage medium such as a CD-ROM and distribute the storage medium to users. In this case, users who meet certain requirements are allowed to download decryption key information from a website via the Internet, and the program decrypted using this key information is installed on a computer.

Further, not only are the functions of the foregoing embodiments implemented by executing the read program codes in a computer, but the functions of the embodiments may also be implemented in cooperation with an operating system or the like running on the computer. In this case, the operating system or the like executes some or all of the actual processing and the functions of the embodiments are implemented by this processing.

Furthermore, it may be so arranged that a program that has been read from a recording medium is written to a memory provided on a function expansion board inserted into the computer or provided in a function expansion unit connected to the computer. In this case, after a program has been written to the function expansion board or function expansion unit, a CPU or the like provided on the function expansion board or function expansion unit performs some or all of the actual processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-165360, filed Jun. 14, 2006, which is hereby incorporated by reference herein in its entirety.

What is claimed is:

1. An information processing apparatus including a processor, the processor executing compression processing of a multivalued original image, comprising:
  a resolution rising unit configured to obtain high-resolution multivalued image by subjecting the multivalued original image to interpolation processing;
  a first binarization unit configured to obtain a first binarized image by applying binarization processing to the high-resolution multivalued image obtained by the resolution rising unit, wherein a resolution of the first binarized image is higher than that of the multivalued original image;
  a second binarization unit configured to obtain a second binarized image by applying binarization processing to the multivalued original image, wherein a resolution of the second binarized image is lower than that of the first binarized image;

a text-region extraction unit configured to extract a text region based on the second binarized image obtained by the second binarization unit, thereby obtaining position information of the extracted text region;

a text-color extraction unit configured to extract text colors based on the multivalued original image, the second binarized image and the position information of the extracted text region;

a partial image generating unit configured to extract partial images, per each of the text colors, from the first binarized image based on the position information of the extracted text region and the text colors, and obtain text color information that correlates each of the partial images and the text color;

a first compression unit configured to generate first compressed data by applying first compression processing to each of the partial images extracted by the partial image generating unit;

a filling unit configured to generate a filled image by filling a text portion of the multivalued original image with a pixel value other than that of the text portion;

a second compression unit configured to generate second compressed data by applying second compression processing to the filled image generated by the filling unit; and a combined compressed data generating unit configured to generate compressed data by combining the first compressed data, the second compressed data, the position information and the text color information.

2. The apparatus according to claim 1, wherein said partial image generating unit performs a color-reduction processing for the text colors extracted by the text-color extraction unit, and extracts the partial images, per each of the text colors after the color-reduction processing, from the first binarized image based on the position information of the extracted text region and the text colors after the color reduction processing, and obtains text color information that correlates each of the partial images and the text colors after the color reduction processing.

3. The apparatus according to claim 1, wherein on the basis of an estimation of amount of data after compression, said partial image generating unit determines whether text regions of the same text color are to be combined or not, and, if it is determined to combine these text regions, extracts the partial images per each of the text colors after they are combined.

4. The apparatus according to claim 2, wherein said partial image generating unit extracts the partial images from the first binarized image based on the position information and a pallet value with which the text colors after the color-reduction processing have been correlated, wherein the first compression unit generates the first compressed data by applying the first compression processing to each of the partial images; and said combined compressed data generating unit generates the compressed data by combining the first compressed data, the second compressed data, the position information of each text region and color information of the pallet value.

5. The apparatus according to claim 1,
wherein said partial image generating unit determines whether to use the first binarized image or the second binarized image based upon the size of text contained in each text region, extracts the partial images from the first binarized image with regard to a text region for which use of the first binarized image has been determined, and extracts the partial image from the second binarized image with regard to a text region for which use of the second binarized image has been determined.

6. The apparatus according to claim 1, wherein said second compression unit reduces the filled image generated by the filling unit, and generates the second compressed data by applying the second compression processing to the reduced filled image.

7. The apparatus according to claim 1, wherein the filling unit reduces the multivalued original image, and generates the filled image by filling the text portion in the reduced multivalued original image with a pixel value other than that of the text portion.

8. An information processing method of executing compression processing of a multivalued original image, comprising:

a resolution rising step of obtaining high-resolution multivalued image by subjecting the multivalued original image to interpolation processing;

a first binarization step of obtaining a first binarized image by applying binarization processing to the high-resolution multivalued image obtained in the resolution rising step, wherein a resolution of the first binarized image is higher than that of the multivalued original image;

a second binarization step of obtaining a second binarized image by applying binarization processing to the multivalued original image, wherein a resolution of the second binarized image is lower than that of the first binarized image;

a text-region extraction step of extracting a text region based on the low-resolution binarized image obtained by the second binarization unit, thereby obtaining position information of the extracted text region;

a text-color extraction step of extracting text colors based on the multivalued original image, the second binarized image and the position information of the extracted text region;

a partial image generating step of extracting partial images, per each of the text colors, from the first binarized image based on the position information of the extracted text region and the text colors, and obtaining text color information that correlates each of the partial images and the text color;

a first compression step of generating first compressed data by applying first compression processing to each of the partial images extracted in the partial image generating step;

a filling step of generating a filled image by filling a text portion of the multivalued original image with a pixel value other than that of the text portion;

a second compression step of generating second compressed data by applying second compression processing to the filled image generated in the filling step; and a combined compressed data generating step of generating compressed data by combining the first compressed data, the second compressed data, the position information and the text color information.

9. A non-transitory computer-readable storage medium storing a computer program for causing a computer to execute the information processing steps comprising:

a resolution rising step of obtaining high-resolution multivalued image by subjecting a multivalued original image to interpolation processing;

a first binarization step of obtaining a first binarized image by applying binarization processing to the high-resolution multivalued image obtained in the resolution rising step, wherein a resolution of the first binarized image is higher than that of the multivalued original image;

a second binarization step of obtaining a second binarized image by applying binarization processing to the multivalued original image, wherein a resolution of the second binarized image is lower than that of the first binarized image;

a text-region extraction step of extracting a text region based on the low-resolution binarized image obtained by the second binarization unit, thereby obtaining position information of the extracted text region;

a text-color extraction step of extracting text colors based on the multivalued original image, the second binarized image and the position information of the extracted text region;

a partial image generating step of extracting partial images, per each of the text colors, from the first binarized image based on the position information of the extracted text region and the text colors, and obtaining text color information that correlates each of the partial images and the text color;

a first compression step of generating first compressed data by applying first compression processing to each of the partial images extracted in the partial image generating step;

a filling step of generating a filled image by filling a text portion of the multivalued original image with a pixel value other than that of the text portion;

a second compression step of generating second compressed data by applying second compression processing to the filled image generated in the filling step; and a combined compressed data generating step of generating compressed data by combining the first compressed data, the second compressed data, the position information and the text color information.

10. The apparatus according to claim 1, wherein said second binarization unit computes a binarization threshold for the multivalued original image and obtains the second binarized image by applying the binarization processing to the multivalued original image using the computed binarization threshold, and wherein said first binarization unit obtain the first binarized image by applying the binarization processing to the high-resolution multivalued image using the binarization threshold which has been computed by the second binarization unit.

11. The method according to claim 8, wherein, in the second binarization step, a binarization threshold is computed for the multivalued original image, and the second binarized image is obtained by applying the binarization processing to the multivalued original image using the computed binarization threshold, and wherein, in said first binarization step, the first binarized image is obtained by applying the binarization processing to the high-resolution multivalued image using the binarization threshold which has been computed in the second binarization step.

* * * * *